United States Patent
Diosdado Borrego et al.

(10) Patent No.: US 11,759,862 B2
(45) Date of Patent: Sep. 19, 2023

(54) LOADING BUILD MATERIAL POWDER WITH A VIBRATING COMPACTOR FOR A 3D PRINTER

(71) Applicant: Hewlett-Packard Development Company, L.P., Spring, TX (US)

(72) Inventors: Jorge Diosdado Borrego, Barcelona (ES); David Chanclon Fernandez, Barcelona (ES); Pablo Antonio Murciego Rodriguez, Barcelona (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 117 days.

(21) Appl. No.: 17/358,426

(22) Filed: Jun. 25, 2021

(65) Prior Publication Data

US 2022/0410270 A1 Dec. 29, 2022

(51) Int. Cl.
| | |
|---|---|
| *B22F 10/37* | (2021.01) |
| *B33Y 30/00* | (2015.01) |
| *B33Y 40/00* | (2020.01) |
| *B29C 64/255* | (2017.01) |
| *B29C 64/321* | (2017.01) |
| *B29C 64/393* | (2017.01) |
| *B29C 64/314* | (2017.01) |
| *B22F 12/90* | (2021.01) |
| *B22F 12/52* | (2021.01) |
| *B22F 12/57* | (2021.01) |
| *B29C 64/165* | (2017.01) |
| *B22F 10/14* | (2021.01) |

(52) U.S. Cl.
CPC ............. *B22F 10/37* (2021.01); *B22F 12/52* (2021.01); *B22F 12/57* (2021.01); *B22F 12/90* (2021.01); *B29C 64/255* (2017.08); *B29C 64/314* (2017.08); *B29C 64/321* (2017.08); *B29C 64/393* (2017.08); *B33Y 30/00* (2014.12); *B33Y 40/00* (2014.12); *B22F 10/14* (2021.01); *B29C 64/165* (2017.08)

(58) Field of Classification Search
CPC ... B29C 64/314; B29C 64/255; B29C 64/321; B22F 10/37; B28B 1/001
See application file for complete search history.

(56) References Cited

U.S. PATENT DOCUMENTS

| | | | |
|---|---|---|---|
| 2019/0030606 A1* | 1/2019 | Mamrak | B22F 10/37 |
| 2020/0230882 A1* | 7/2020 | Eideloth | B29C 64/255 |
| 2021/0107064 A1* | 4/2021 | Zhang | B22F 12/67 |
| 2022/0008999 A1* | 1/2022 | Friesth | C23C 4/04 |
| 2022/0266345 A1* | 8/2022 | Rossi | B22F 12/57 |

FOREIGN PATENT DOCUMENTS

WO  WO 2021/061161  4/2021

* cited by examiner

*Primary Examiner* — Leith S Shafi
*Assistant Examiner* — Nicholas J Chidiac
(74) *Attorney, Agent, or Firm* — Shook, Hardy & Bacon L.L.P.

(57) ABSTRACT

In one example, a process for loading a build material powder supply container for 3D printing includes, with a floor of the supply container at or near a top of the supply container, dispensing build material powder into a loading chamber surrounding the top of the supply container and on to the floor, compacting powder in the loading chamber, and lowering the floor with the compacted powder into the supply container.

13 Claims, 11 Drawing Sheets

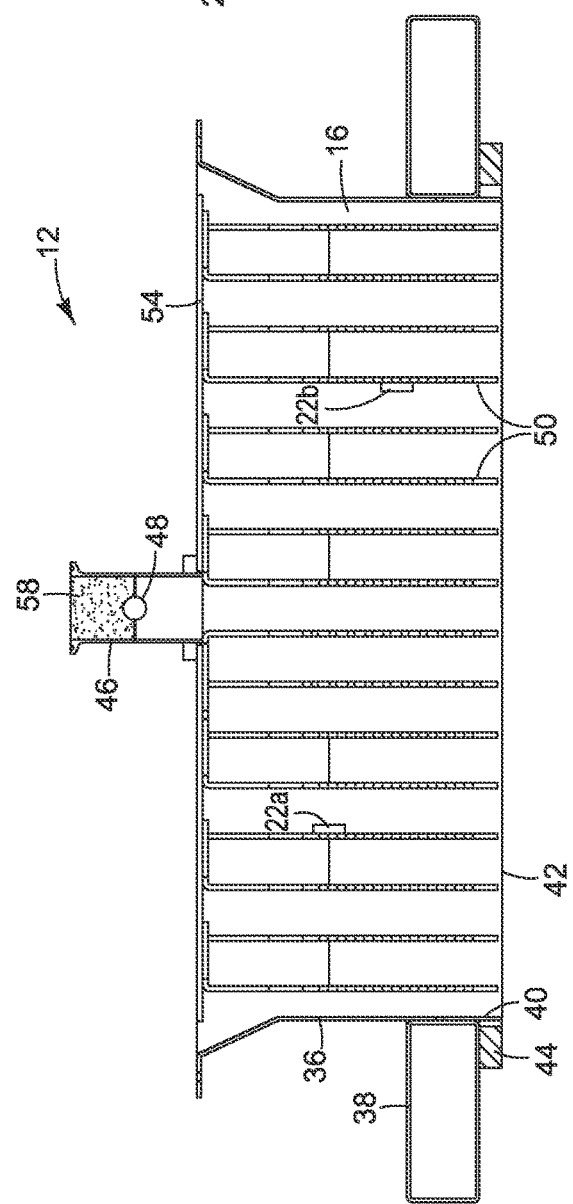
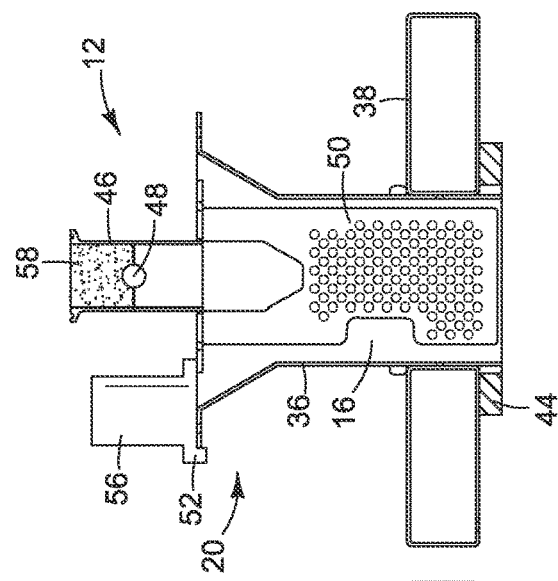
FIG. 5
FIG. 6

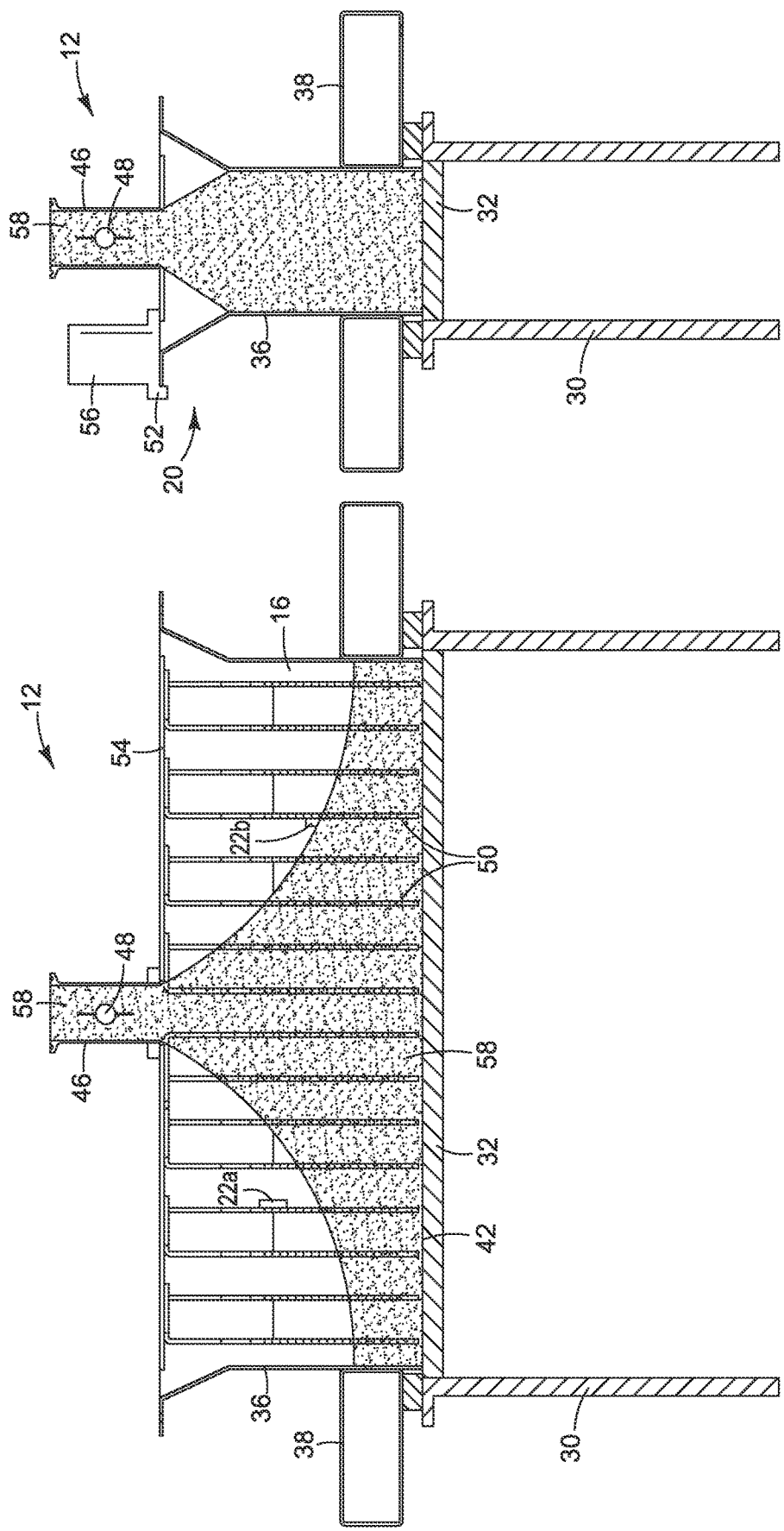

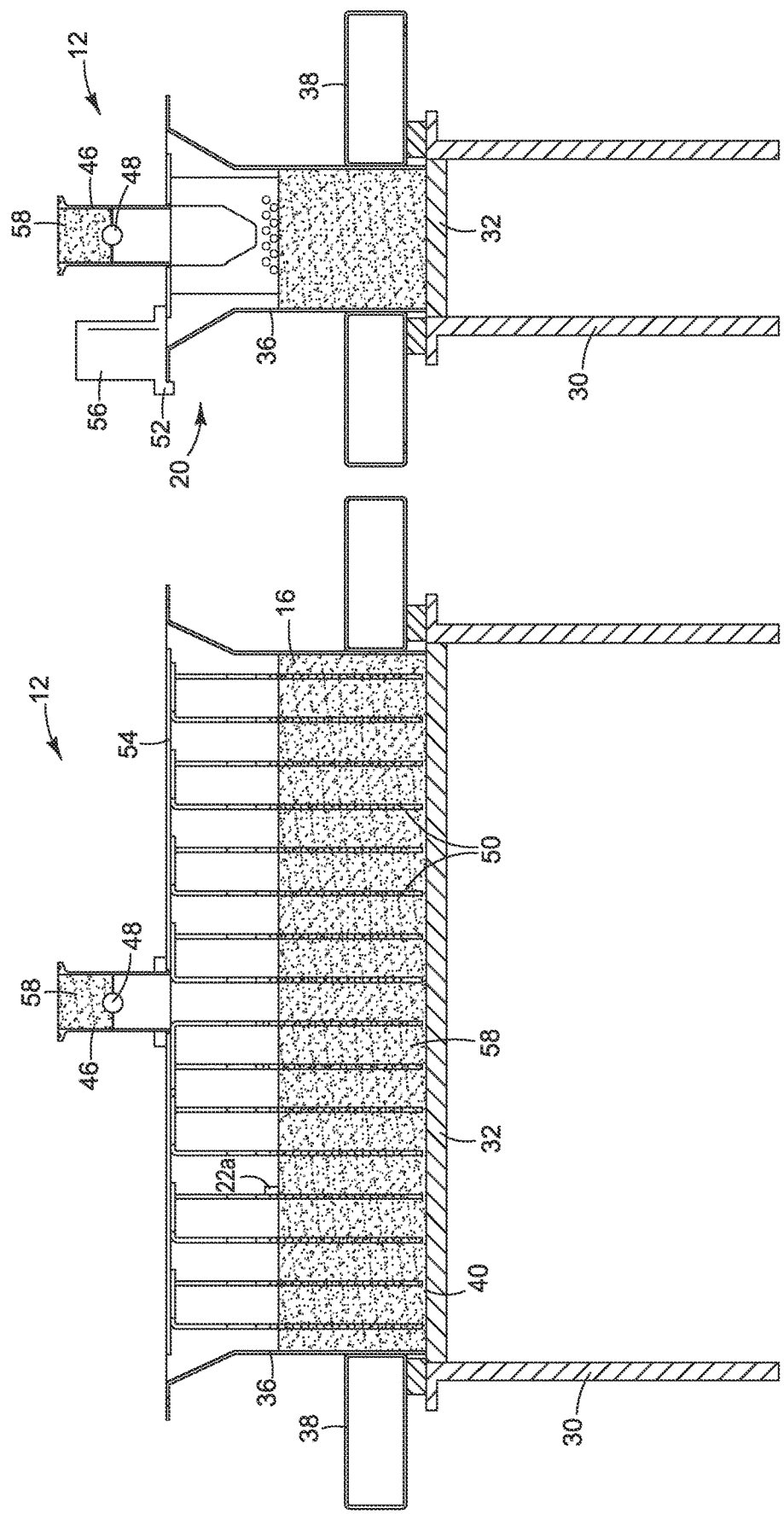

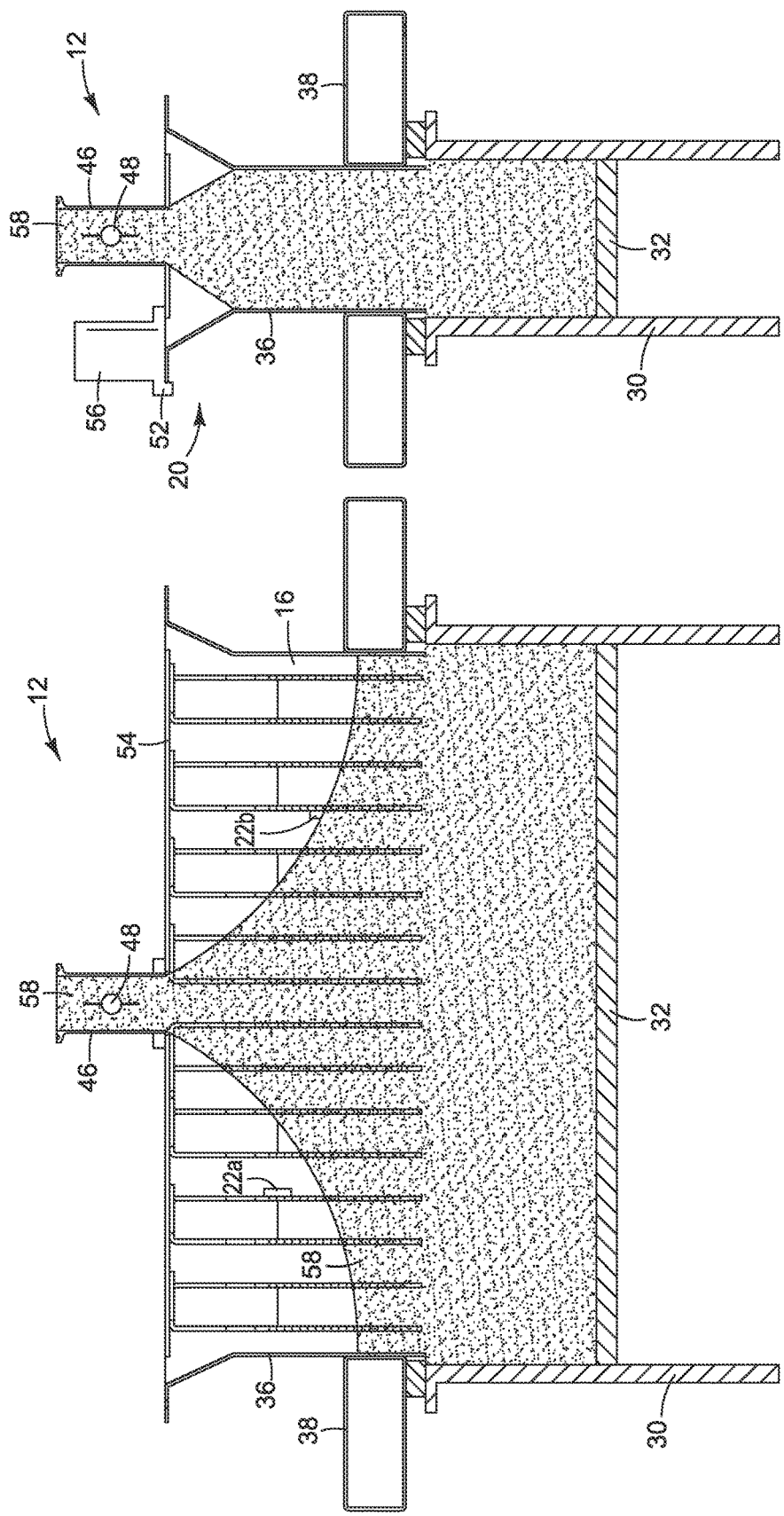

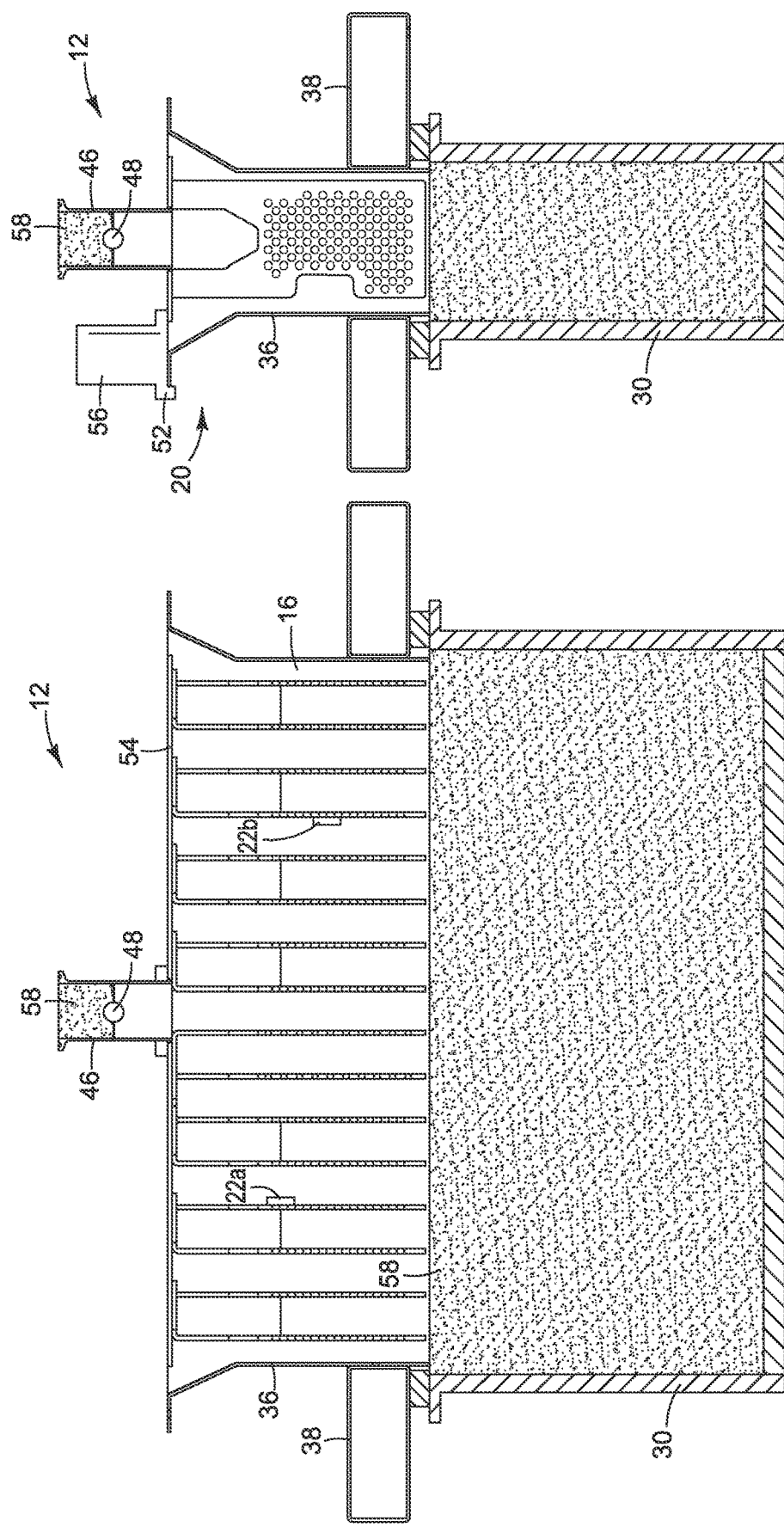

LOADING BUILD MATERIAL POWDER WITH A VIBRATING COMPACTOR FOR A 3D PRINTER

BACKGROUND 3D printers convert a digital representation of an object into a physical object. 3D printing includes any of various processes in which material is bound or solidified under computer control to create a three dimensional object. 3D printing is also commonly referred to as additive manufacturing. 3D printers are often used to manufacture objects with complex geometries using materials such as thermoplastics, polymers, ceramics and metals. In powder based 3D printing, successive layers of a powdered build material are formed and portions of each layer bound or fused in a desired pattern to build up the object.

DRAWINGS

FIGS. 3-6 illustrate one example of a loading assembly such as might be used in a system shown in FIGS. 1 and 2.

FIGS. 7-16 illustrate an example sequence for loading build material powder into a supply container with the loading assembly shown in FIGS. 3-6.

The same part numbers refer to the same or similar parts throughout the figures. The figures are not necessarily to scale.

DESCRIPTION

Figure 1:
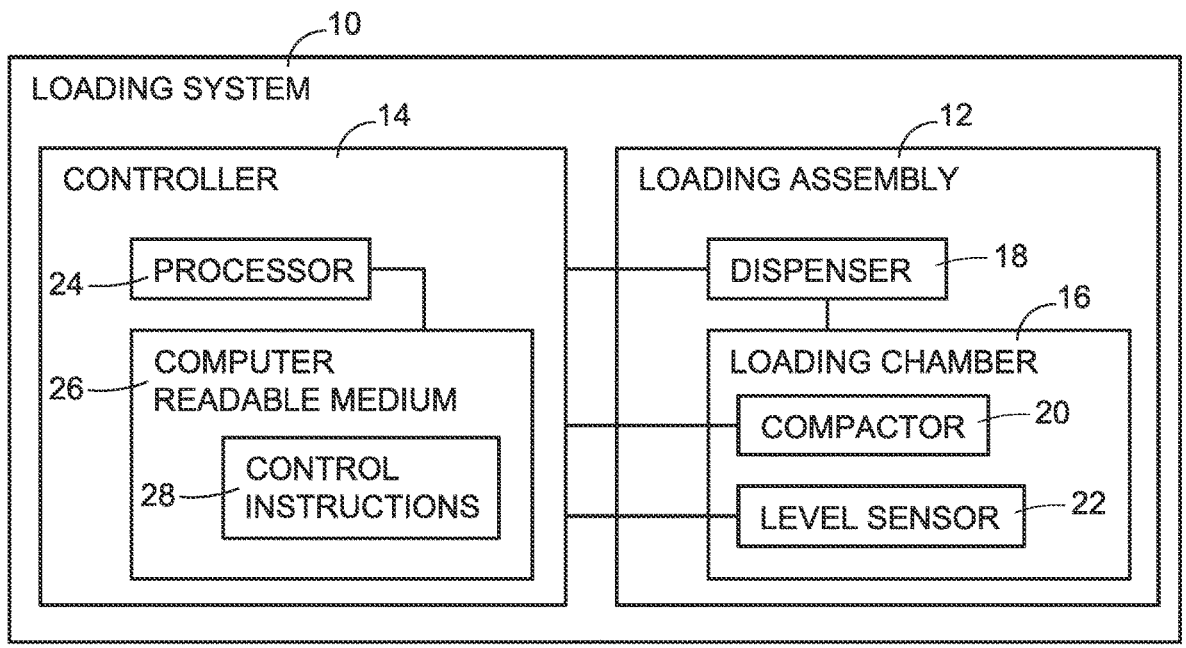
FIG. 1 illustrates an example system for loading build material powder into a supply container for a 3D printer.

Metal objects may be printed by selectively applying a liquid binder to portions of each of successive layers of metal powder corresponding to a solid layer of the 3D object. The binder is cured, for example using heat and/or ultra violet light, to hold the metal powder particles together in the desired shape. The cured object, known commonly as a "green part," is heated in a sintering furnace to fuse the metal particles. Polymer objects may be printed by selectively applying a liquid, energy absorbing fusing agent to portions of each of successive layers of polymer powder and exposing the treated powder in each layer to light, heat and/or other electromagnetic radiation, causing the treated powder to heat up, coalesce, and fuse as part of the printing process.

In some 3D printing systems, objects are printed on a platform in a build chamber that is part of a build unit that also includes a powder supply container next to the build chamber. The build platform moves down incrementally inside the build chamber to receive each successive layer of build material for printing. The floor of the powder supply container moves up incrementally to present the desired quantity of build material powder to a layering device that spreads the next layer of powder over the build platform. The build unit may include a single supply container on only one side of the build platform or multiple supply containers on two (or more) sides of the build platform.

Build material powder loaded into a supply container at a single location in the center of the container tends to form a mound of powder near the center of the container. Powder in the mound near the top of the container is usually less dense than powder lower in the container. Uniform density throughout the volume of powder in a supply container is desirable to utilize the full capacity of the supply container more effectively and to improve layering powder from the supply container over the build platform. A new loading system has been developed to help reduce mounding and increase uniformity by dispensing the build material powder into a loading chamber positioned over the supply container, where it can be compacted to increase uniformity, and then lowered into the supply container.

In one example, the loading system includes a loading chamber with an open lower part, a dispenser to dispense build material powder into the loading chamber, and a compactor to compact powder in the loading chamber. For loading, the supply container is positioned under the open part of the loading chamber with the floor of the supply container raised to the top of the supply container. Build material powder is then dispensed into the loading chamber and on to the floor of the supply container. The powder in the loading chamber is compacted and the floor lowered into the supply container with the compacted powder. In an example, the build material powder is dispensed into the loading chamber and compacted as the floor is lowered, until the supply container is filled with compacted powder. In another example, the build material powder is dispensed into the loading chamber and compacted in discrete doses and the floor lowered for each dose, until the supply container is filled with compacted powder.

These and other examples described herein illustrate but do not limit the scope of the patent which is defined in the Claims following this Description.

As used in this document: "and/or" means one or more of the connected things; a "computer readable medium" means any non-transitory tangible medium that can embody, contain, store, or maintain programming for use by a computer processor and may include, for example, circuits, integrated circuits, ASICs (application specific integrated circuits), hard drives, random access memory (RAM), read-only memory (ROM), and memory cards and sticks; and a "screen" means a perforated plate or wire mesh.

FIG. 1 illustrates an example system 10 for loading build material powder into a supply container for a 3D printer. Referring to FIG. 1, loading system 10 includes a loading assembly 12 and a controller 14. Loading assembly 12 includes a loading chamber 16, a dispenser 18 to dispense build material powder into chamber 16, and a compactor 20 to compact powder in chamber 16. In this example, loading assembly 12 also includes a level sensor 22 to sense the level of powder in loading chamber 16.

Controller 14 is operatively connected to dispenser 18, compactor 20, and level sensor 22. Controller 14 includes the programming, processing and associated memory resources, and the other electronic circuitry and components to control the operative elements of system 10. Controller 14 may include distinct control elements for individual system components. In particular, controller 14 in FIG. 1 includes a processor 24 and a computer readable medium 26 with system control instructions 28 operatively connected to processor 24. Control instructions 28 represent programming that enables controller 14 to control dispenser 18 and compactor 20 during loading.

Dispenser 18 dispenses build material powder into loading chamber 16 and compactor 20 compacts the powder in chamber 16. The compacted powder is lowered out of loading chamber 16 into a supply container. Powder may be dispensed into loading chamber 16 and compacted continuously as the compacted powder is lowered into the supply container, or the powder may be dispensed, compacted, and lowered in discrete doses. If level sensor 22 senses the level of powder in chamber 16 above or below a threshold, controller 14 may adjust the rate at which powder is dispensed into chamber 16 and/or the rate at which compacted powder is lowered into the supply container to maintain the powder at the desired level. For discrete dosing, level sensor 22 may signal controller 14 that the powder in chamber 16 has reached a level corresponding to the desired dosage for lowering a dose of compacted powder into the supply container.

Figure 2:
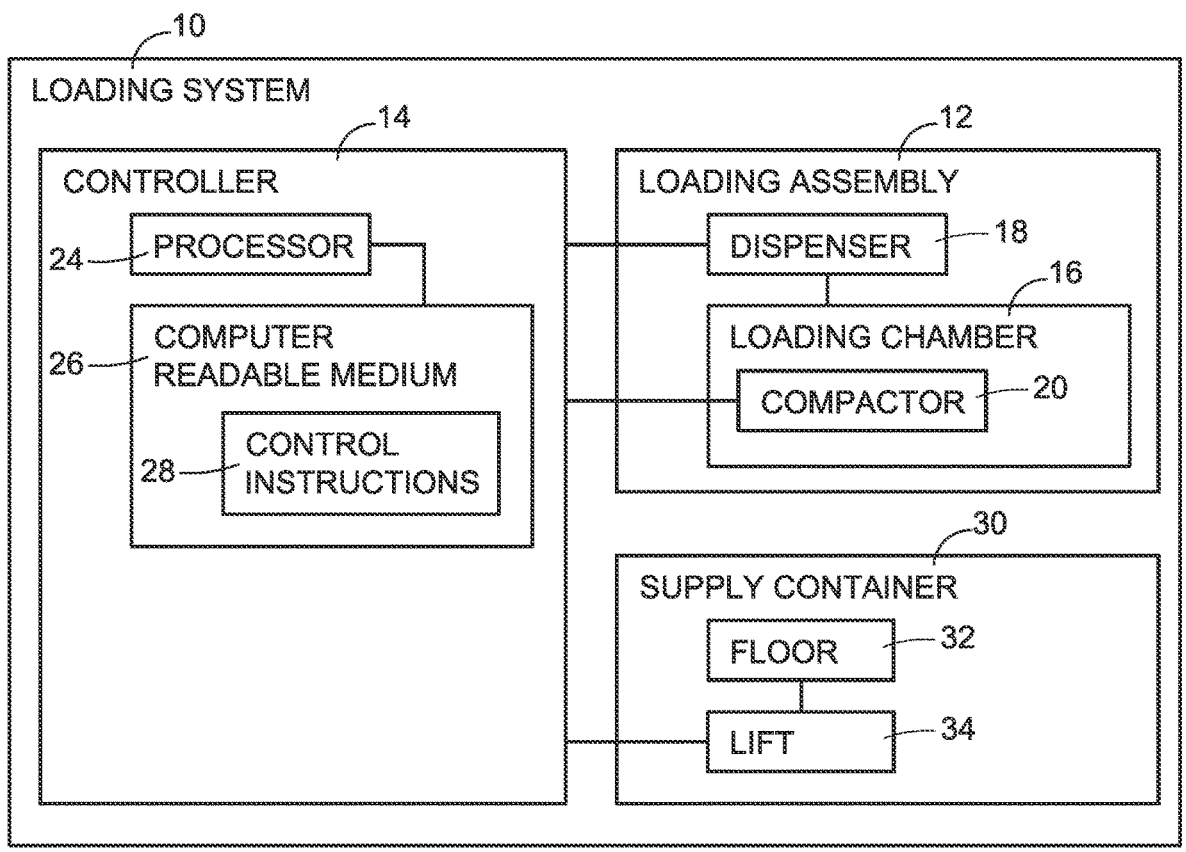
FIG. 2 illustrates another example of a system for loading build material powder into a supply container for a 3D printer.
Figure 3:
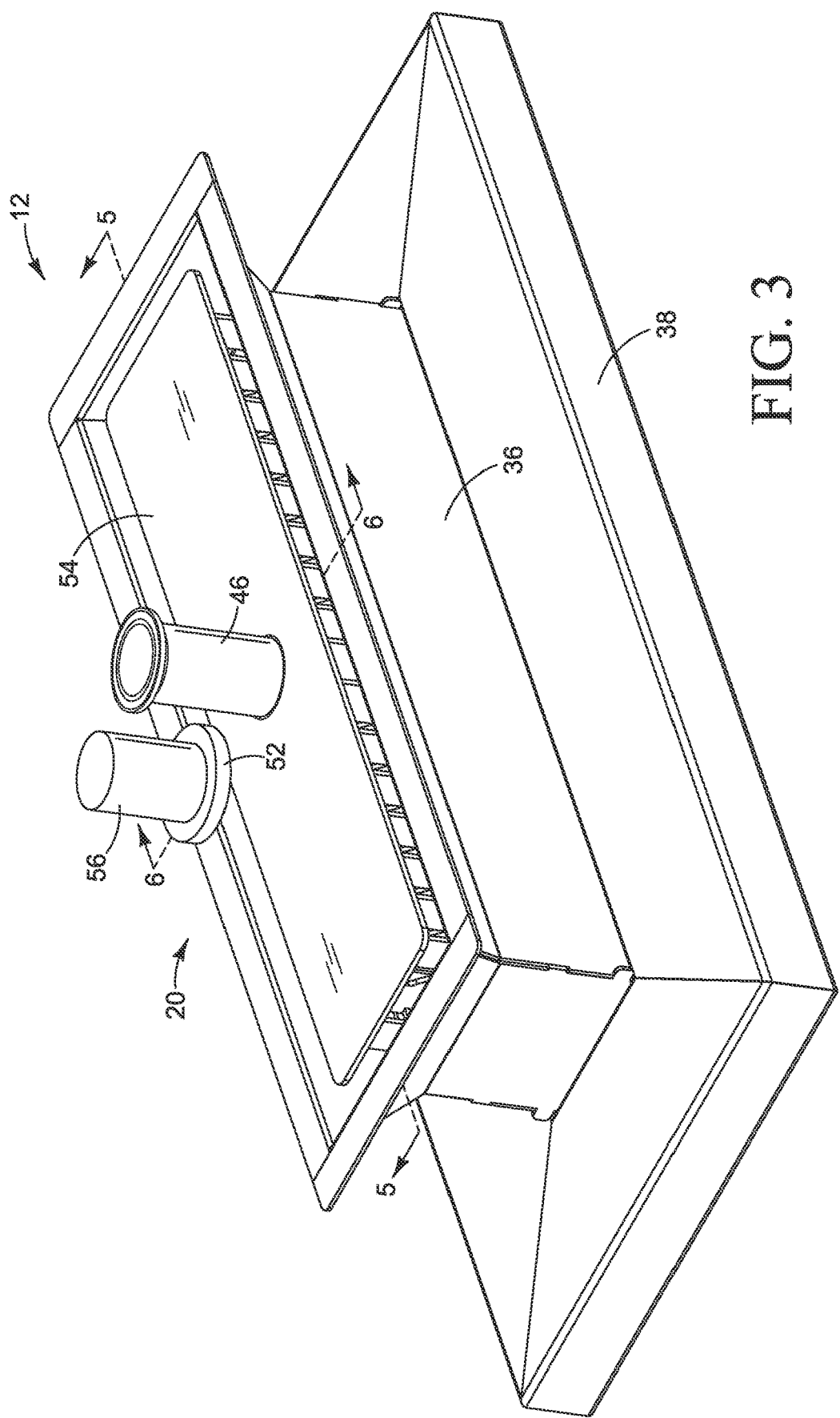
Figure 4:
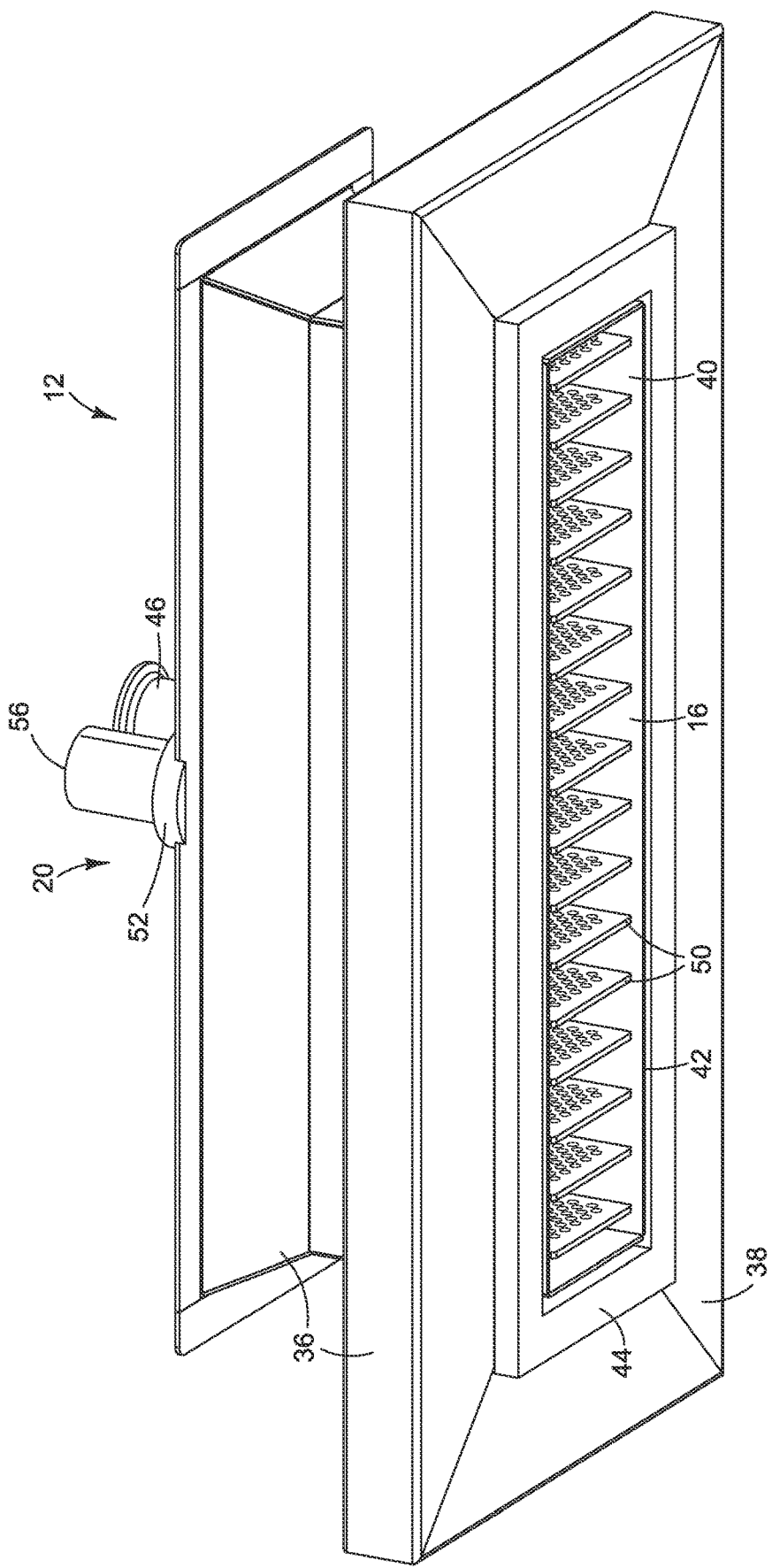

FIG. 2 illustrates another example of a system 10 for loading build material powder into a supply container for a 3D printer. Referring to FIG. 2, loading system 10 includes a loading assembly 12, a controller 14, and a supply container 30. Supply container 30 may be implemented, for example, as part of a portable build unit that also includes a build chamber where objects are printed. Some build units include a supply container on each side of the build chamber. A portable build unit may be wheeled or otherwise moved between a loading station to fill the build material supply container(s), a 3D printer where the build material is used to print the objects, a "decaking" station where the objects are separated from the powder bed and unloaded from the building unit, and then back to loading station. A supply container 30 in FIG. 2, therefore, may represent a supply container in each of multiple different build units.

Still referring to FIG. 2, loading assembly 12 includes a loading chamber 16 and a dispenser 18 to dispense build material powder into chamber 16. Container 30 includes a floor 32 and a lift 34 that moves floor 32 up and down for loading build material powder into container 30 and for presenting build material powder to the recoater in a 3D printer. Floor 32 represents the floor to the containment volume in supply container 30 and does not preclude a separate housing under container 30. Lift 34 represents any suitable device for raising and lower floor 32, including the lifts commonly used in portable build units.

Controller 14 is operatively connected to dispenser 18 and lift 34. Controller 14 includes the programming, processing and associated memory resources, and the other electronic circuitry and components to control the operative elements of system 10. Controller 14 may include distinct control elements for individual system components. In particular, controller 14 in FIG. 2 includes a processor 24 and a computer readable medium 26 with system control instructions 28 operatively connected to processor 24. Control instructions 28 represent programming that enables controller 14 to control dispenser 18 and lift 34 during loading.

In one example, controller 14 executing instructions 28 controls lift 34 to position floor 32 in container 30 immediately under loading chamber 16, controls dispenser 18 to dispense a first dose of build material powder into loading chamber 16 and on to floor 32, controls lift 34 to lower floor 32 with the first dose of powder to a position in which the top of the first dose is immediately under loading chamber 16, controls dispenser 18 to dispense a second dose of powder into loading chamber 16 and on to the top of the first dose, and controls lift 34 to lower floor 32 further into supply container 30 with the first and second doses. The process may be repeated for succeeding doses until supply container 30 is filled.

In another example, controller 14 executing instructions 28 controls lift 34 to position floor 32 in container 30 immediately under loading chamber 16, controls dispenser 18 to dispense powder into chamber 16 and on to floor 32, and, after a desired volume of powder has accumulated in chamber 16, controls lift 34 to lower floor 32 into supply container 30 continuously as more powder is dispensed into chamber 16, until supply container 30 is filled.

If compaction is desired, loading system 10 in FIG. 2 may also include a compactor 20 to compact powder in chamber 16. In one example, dispensing and compacting are performed simultaneously, for example during each dosing cycle for discrete dosing or throughout a continuous filling operation. In another example, a discrete amount of powder is dispensed into chamber 16 and then compacted, and then more powder is dispensed and compacted until the desired volume is loaded into chamber 16.

FIGS. 3-6 illustrate one example of a loading assembly 12 such as might be used in a system 10 shown in FIGS. 1 and 2. Referring to FIGS. 3-6, assembly 12 includes a housing 36, a loading chamber 16 inside housing 36, and a base 38 surrounding the lower part of housing 36. The lower part 40 of housing 36 forms an outlet 42 from chamber 16 through which build material powder is loaded into a supply container. It is expected that outlet 42 usually will be approximately the same size and shape as the opening at the top of the supply container. A face 44 surrounding outlet 42 contacts the top part of the supply container during loading. It may be desirable to implement face 44 as or with a seal to seal against the escape of powder into the surrounding spaces during loading.

Dispenser 18 (FIGS. 1 and 2) includes a conduit 46 in FIGS. 3-6 mounted in a housing cover or another suitable support structure over loading chamber 16. The housing cover is omitted from the figures to not obscure the underlying parts. Conduit 46 is operatively connected to a powder source (not shown). Powder is pumped or otherwise delivered to conduit 46 from the source and into loading chamber 16. Dispenser 18 (FIGS. 1 and 2) may include a valve 48 to regulate the flow of powder through conduit 46, for example at the direction of a controller 14 shown in FIGS. 1 and 2. Other suitable configurations for a dispenser 18 are possible. For example, powder could be loaded into chamber 16 from the sides and/or using an auger, pump, or another type of transfer mechanism.

Loading assembly 12 in FIGS. 3-6 includes a compactor 20, a higher level sensor 22A and a lower level sensor 22B. Compactor 20 includes movable compaction elements 50 and an actuator 52 operatively connected to elements 50, for example through a plate 54 mounting compaction elements 50. Actuator 52 controls the movement of compaction elements 50 at the direction of a controller 14 shown in FIGS. 1 and 2. In the example shown in FIGS. 3-6, compaction elements 50 are implemented as a series of screens mounted to the underside of plate 54 and oriented vertically in chamber 16. Actuator 52 is implemented as a motor driven vibrator. Vibrator 52 vibrates plate 54 and thus screens 50 at the urging of a motor 56. The movement of screens 50 causes powder in chamber 16 to settle, become more compact, and thus more dense. Other suitable configurations for the compaction element(s) and/or actuator are possible. For example, one or multiple actuators 52 could be used to move a corresponding one or multiple blades (perforated or not perforated) or other compaction elements 50 up and down and/or side to side to compact and distribute powder in loading chamber 16.

FIGS. 7-16 illustrate an example sequence for loading build material powder into a supply container 30 with a loading assembly 12 shown in FIGS. 3-6. FIGS. 7, 9, 11, 13, and 15 and FIGS. 8, 10, 12, 14, and 16 are sections viewed along the lines 5-5 and 6-6 in FIG. 3, respectively. In FIGS. 7/8 and 9/10, with supply container 30 under loading assembly 12 and floor 32 raised to a position immediately under loading chamber 16, a first dose of build material powder 58 is dispensed into chamber 16 and on to floor 32, and compacted. FIGS. 7 and 8 show powder 58 as it is dispensed, forming a mound under conduit 46. FIGS. 9 and 10 show the first dose of powder 58 after compaction. In this example, valve 48 is closed in FIGS. 9 and 10 after dispensing and compacting a discrete first dose of powder 58. In another example, valve 48 remains open to allow a continuous flow of powder into loading chamber 16.

Figures 13, 14:
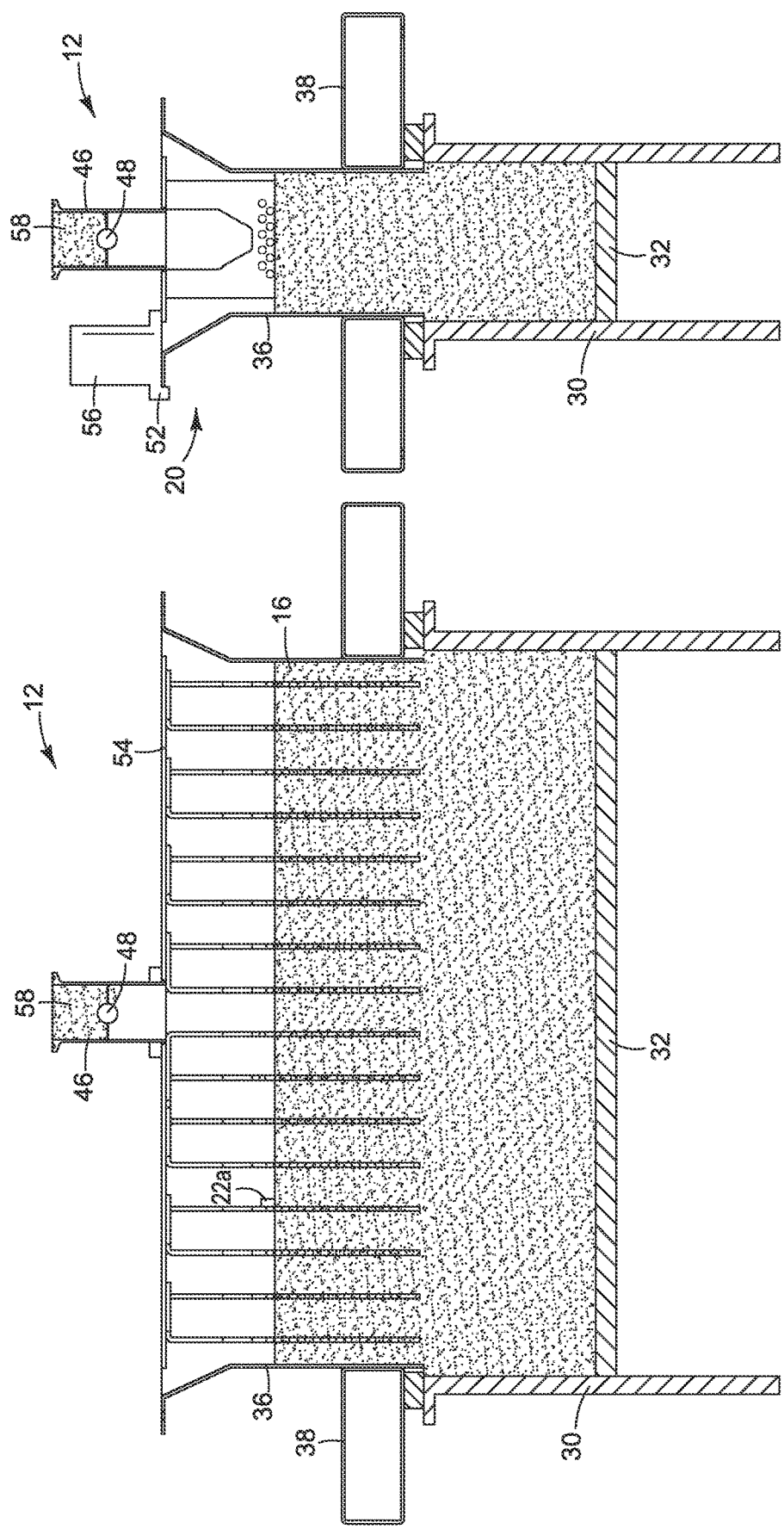

In FIGS. 11/12 and 13/14, with floor 32 lowered into supply container 30 a distance that places the top of the first dose of compacted powder immediately under loading chamber 16, a second dose of powder 58 is dispensed into chamber 16 and on to the top of the first dose of compacted powder, and compacted. FIGS. 11 and 12 show powder 58 as it is dispensed, forming a mound under conduit 46. FIGS. 13 and 14 show the second dose of powder 58 after compaction. In this example, valve 48 is closed in FIGS. 13 and 14 after dispensing and compacting a discrete second dose of powder 58.

In FIGS. 15 and 16, floor 32 is lowered further into container 30 with both doses of compacted powder. In this example, supply container 30 is filled after two doses. If a container 30 holds more than two doses, the loading sequence may be repeated for succeeding doses until container 30 is filled.

Powder 58 may be dispensed through conduit 46 into loading chamber 16 continuously throughout the entire loading process, continuously during each stage of the loading process (where there are multiple stages), or intermittently in discrete amounts as shown in FIGS. 7-16. In one example, compactor 20 compacts build material powder 58 while powder 58 is being dispensed into loading chamber 16. In another example, compactor 20 compacts powder 58 intermittently as powder is dispensed into chamber 16 or only when powder 58 is not being dispensed into chamber 16.

Feedback from level sensors 22A and 22B may be used by a system controller 14 in FIGS. 1 and 2 to control the loading operation. For example, for a continuous fill operation, valve 48 is opened to allow powder 58 to flow into loading chamber 16 until lower level sensor 22B senses powder 58 at a lower threshold, for example as shown in FIG. 7. Powder 58 is compacted in chamber 16 for a predetermined time to compact and distribute the powder before beginning to lower container floor 32. Floor 32 is lowered as powder 58 continues to flow through valve 48 into chamber 16. Controller 12 coordinates the rate of descent of floor 32 and the rate of flow of powder 58 through valve 48 to achieve the desired degree of compaction of powder 58 in chamber 16, for example as shown in FIGS. 9 and 10. If higher level sensor 22A senses powder 58 above an upper threshold or lower level sensor 22B senses powder 58 below the lower threshold, the rate of descent of floor 32 and/or the rate of powder flow through valve 48 may be adjusted to return powder 58 to the desired level in chamber 16.

In another example, for a discrete dosing fill operation shown in FIGS. 7-16, powder 58 is dispensed into loading chamber 16 and compacted until upper level sensor 22A senses powder 58 at the upper threshold, as shown in FIGS. 9 and 13. Floor 32 is then lowered into supply container 30 with the first dose of compacted powder to a position for receiving the next dose.

Any suitable sensor may be used for powder level sensors 22A, 22B. In one example, powder level sensors 22A, 22B are capacitive sensors that enable the controller to detect when the powder is in contact with the sensors. Other types of sensors, such as inductive sensors, could be used.

When engaged for loading, face 44 may cover and seal the top of supply container 30, as shown in FIGS. 7-16, to help prevent powder 58 escaping into the surrounding spaces. In one example, loading assembly 12 is moved down to engage supply container 30 for loading. In another example, supply container 30 is moved up to engage loading assembly 12 for loading.

Figure 17:
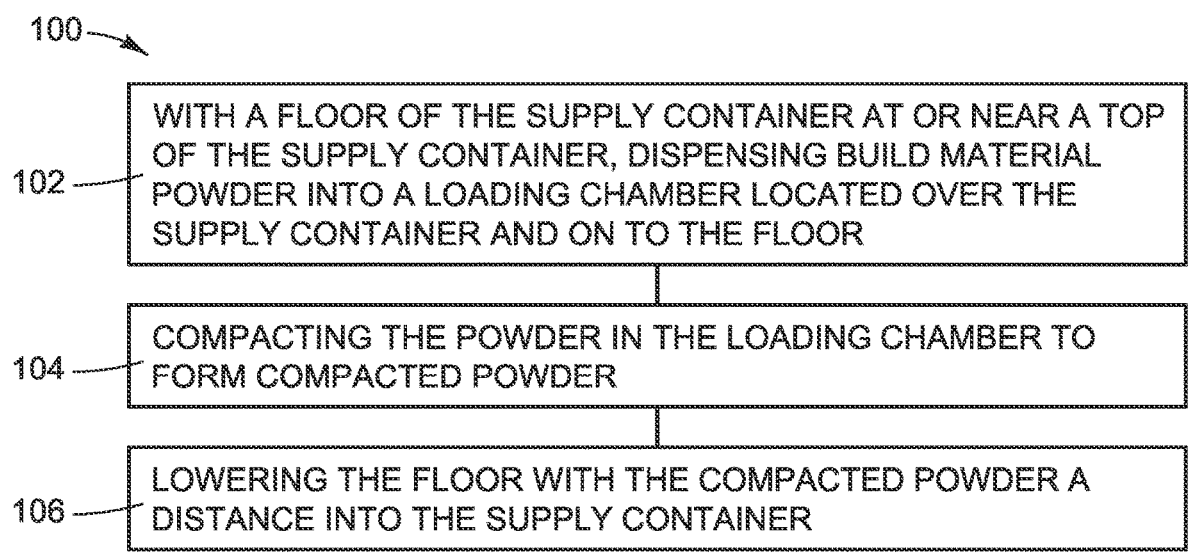
FIG. 17 illustrates an example process for loading a build material powder supply container for 3D printing.

FIG. 17 illustrates an example process 100 for loading a build material powder supply container for 3D printing, such as might be implemented by a processor 24 executing instructions 28 on controller 14 in FIGS. 1 and 2. Referring to FIG. 17, process 100 includes, with the floor of the supply container at or near the top of the supply container, dispensing build material powder into a loading chamber located over the supply container and on to the floor (block 102), compacting the powder in the loading chamber to form compacted powder (block 104), and lowering the floor with the compacted powder a distance into the supply container (block 106).

For a continuous fill operation, the dispensing, compacting, and lowering in FIG. 17 may be performed together continuously during at least part of the fill operation. For a discrete dosing fill operation, the dispensing, compacting, and/or lowering in FIG. 17 may be performed at different times and/or for discrete doses.

Figure 18:
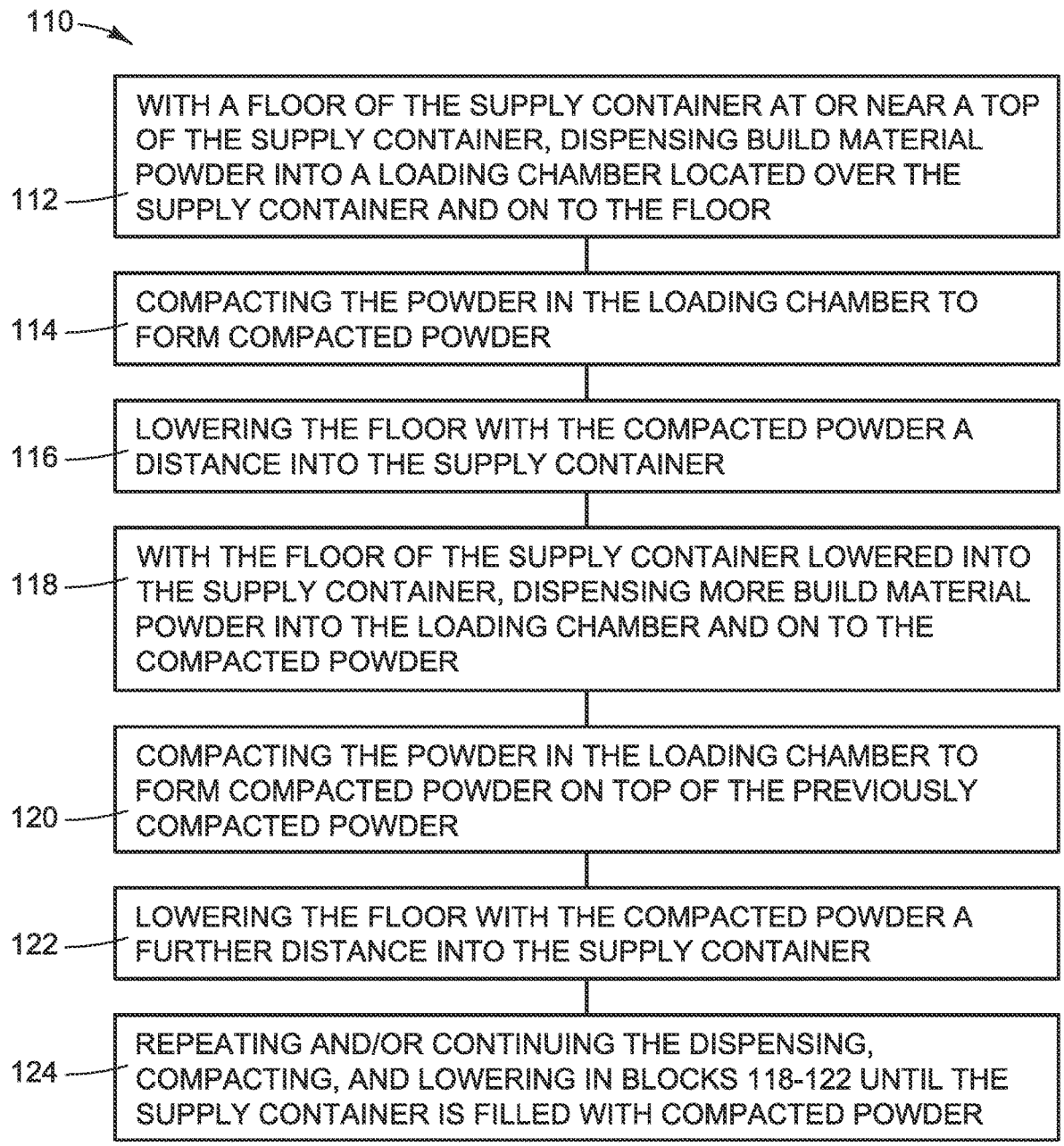
FIG. 18 illustrates another example process for loading a build material powder supply container for 3D printing.

FIG. 18 illustrates another example process 110 for loading a build material powder supply container for 3D printing, such as might be implemented by a processor 24 executing instructions 28 on controller 14 in FIGS. 1 and 2. Referring to FIG. 18, process 110 includes, with the floor of the supply container at or near the top of the supply container, dispensing build material powder into a loading chamber located over the top of the supply container and on to the floor (block 112), compacting the powder in the loading chamber to form compacted powder (block 114), and lowering the floor with the compacted powder a distance into the supply container (block 116), for example as shown in FIGS. 7-10. Then, with the floor of the supply container lowered into the supply container, dispensing more build material powder into the loading chamber and on to the compacted powder (block 118), compacting the powder in the loading to form compacted powder on top of the previously compacted powder (block 120), and then lowering the floor with the compacted powder a further distance into the supply container (block 122), for example as shown in FIGS. 11-14, and continuing and/or repeating the dispensing, compacting, and lowering in Blocks 118-122 until the supply container is filled with compacted powder (124).

For a continuous fill operation, the dispensing, compacting, and lowering in FIG. 18 may be performed together continuously during at least part of the fill operation. For a discrete dosing fill operation, the dispensing, compacting, and/or lowering in FIG. 18 may be performed at different times and/or for discrete doses.

These and other examples shown in the figures and described below illustrate but do not limit the patent, which is defined in the following Claims.

"A" and "an" used in the claims means one or more.

The invention claimed is:

1. A system for loading a build material powder supply container for 3D printing, the system comprising:
a loading chamber having an open lower part;
a face surrounding the lower part of the loading chamber and configured to contact a top part of the supply container during loading;
a dispenser to dispense build material powder into the loading chamber; a compactor to compact powder in the loading chamber, wherein the compactor comprises a screen; and
an actuator configured to vibrate the screen.

2. The system of claim 1, wherein the screen is multiple screens and wherein the actuator simultaneously vibrates the multiple screens.

3. The system of claim 1, wherein the face includes a sealing surface to contact and seal the top part of the supply container against the escape of powder during loading.

4. The system of claim 1, comprising a controller operatively connected to the dispenser and the compactor, the controller programmed to:
control the dispenser to dispense a first dose of build material powder into an empty loading chamber;
control the compactor to compact the first dose in the loading chamber;
after the loading chamber is emptied of the compacted first dose, control the dispenser to dispense a second dose of build material powder into the empty loading chamber; and
control the compactor to compact the second dose in the loading chamber.

5. The system of claim 1, comprising:
a first level sensor to sense a first level of powder in the loading chamber; and
a second level sensor to sense a second level of powder in the loading chamber higher than the first level.

6. The system of claim 5, comprising a controller operatively connected to the dispenser, the compactor, and the level sensors, the controller programmed to:
control the dispenser to dispense build material powder into the loading chamber;
control the compactor to compact powder in the loading chamber; and
based on feedback from the level sensors, control the dispenser to dispense powder at a rate that maintains a level of the powder in the loading chamber between the first level and the second level.

7. A system for loading a build material powder supply container for 3D printing, the system comprising:
a supply container having an open top part and a movable floor;
a loading assembly over the supply container, the loading assembly comprising:
a loading chamber having an open lower part matching the top part of the supply container, the loading chamber comprising a compactor to compact powder in the loading chamber, the compactor comprising a screen;
an actuator configured to vibrate the screen; and
a dispenser to dispense a build material powder into the loading chamber; and
a controller operatively connected to the supply container and the loading assembly, the controller programmed to:
control the floor to move up in the supply container to a position immediately under the loading chamber;
control the dispenser to dispense build material powder into the loading chamber and on to the floor of the supply container;
control the floor to move down in the supply container;
control the dispenser to dispense more powder into the loading chamber; and
control the floor to move further down in the supply container.

8. The system of claim 7, wherein the controller is programmed to control the floor to move down in the supply chamber while controlling the dispenser to dispense powder into the loading chamber.

9. The system of claim 7, wherein
the controller is programmed to control the actuator to vibrate the screen in the loading chamber.

10. The system of claim 7, wherein the controller is programmed to control the floor to move down in the supply chamber while controlling the dispenser to dispense powder into the loading chamber and while controlling the compactor to compact the powder in the loading chamber.

11. The system of claim 7, wherein the controller is programmed to control the dispenser and the floor to repeat and/or continue the dispensing and lowering until the supply container is filled with powder.

12. The system of claim 7, wherein the controller is programmed to control the dispenser, the compactor, and the floor to repeat and/or continue the dispensing, compacting and lowering until the supply container is filled with compacted powder.

13. The system of claim 7, wherein the loading assembly includes a seal surrounding the lower part of the loading chamber that contacts the top part of supply container to seal the top part of the supply container against the escape of powder during loading.

* * * * *